United States Patent
Sakashita

(10) Patent No.: US 10,489,694 B2
(45) Date of Patent: Nov. 26, 2019

(54) IMAGE FORMING SYSTEMS

(71) Applicant: KYOCERA Document Solutions Inc., Osaka (JP)

(72) Inventor: Fumiya Sakashita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 20 days.

(21) Appl. No.: 15/872,123

(22) Filed: Jan. 16, 2018

(65) Prior Publication Data

US 2018/0204098 A1     Jul. 19, 2018

(30) Foreign Application Priority Data

Jan. 17, 2017   (JP) ................................ 2017-005802

(51) Int. Cl.
   *G06K 15/10*  (2006.01)
   *H04N 1/00*   (2006.01)
   (Continued)

(52) U.S. Cl.
   CPC .............. *G06K 15/102* (2013.01); *B41J 2/01* (2013.01); *G06K 15/007* (2013.01);
   (Continued)

(58) Field of Classification Search
   CPC ....... B41J 2/21; G06K 15/102; G06K 15/007; G06K 15/027; G06K 15/186; H04N 1/0044
   See application file for complete search history.

(56) References Cited

U.S. PATENT DOCUMENTS

| 7,725,015 B2 * | 5/2010 | Tanoue | H04N 1/00129 348/211.2 |
| 7,956,895 B2 * | 6/2011 | Kojima | H04N 1/00278 348/207.2 |

(Continued)

FOREIGN PATENT DOCUMENTS

| JP | 2008-145472 A | 6/2008 |
| JP | 2010-157035 A | 7/2010 |

(Continued)

OTHER PUBLICATIONS

An Office Action mailed by the Japanese Patent Office dated Apr. 2, 2019, which corresponds to Japanese Patent Application No. 2017-005802 and is related to U.S. Appl. No. 15/872,123; with English translation.

*Primary Examiner* — Thinh H Nguyen
(74) *Attorney, Agent, or Firm* — Studebaker & Brackett PC

(57) ABSTRACT

An image forming system includes an image forming apparatus and a mobile terminal. The image forming apparatus forms an image on paper. The image forming apparatus includes a controller that generates data of a temporally changing image that represents a temporal change of the image. The mobile terminal includes an imaging section, an operation display section, a transmitter-receiver, and a controller. The imaging section generates data of a captured image by capturing the image formed on the paper. The operation display section displays the captured image. The transmitter-receiver is connected to the controller via a network. The controller controls the transmitter-receiver to obtain the data of the temporally changing image from the controller. The controller controls the operation display section to display the temporally changing image over the captured image.

9 Claims, 5 Drawing Sheets

(51) Int. Cl.
  *B41J 2/01*     (2006.01)
  *G06K 15/02*    (2006.01)
  *G06K 15/00*    (2006.01)
  *H04N 5/225*    (2006.01)

(52) U.S. Cl.
  CPC ......... *G06K 15/027* (2013.01); *G06K 15/186* (2013.01); *H04N 1/0044* (2013.01); *H04N 5/225* (2013.01)

(56) References Cited

U.S. PATENT DOCUMENTS

| | | | |
|---|---|---|---|
| 8,570,382 B2 * | 10/2013 | Kashihara | H04N 1/00347 348/207.1 |
| 10,142,512 B2 | 11/2018 | Koujimoto et al. | |
| 2012/0154833 A1 | 6/2012 | Ikeda | |
| 2016/0325558 A1 * | 11/2016 | Strijckers | B41M 5/0047 |
| 2018/0013916 A1 | 1/2018 | Koujimoto et al. | |

FOREIGN PATENT DOCUMENTS

| | | |
|---|---|---|
| JP | 2012-126021 A | 7/2012 |
| JP | 2016-184192 A | 10/2016 |

\* cited by examiner

IMAGE FORMING SYSTEMS

INCORPORATION BY REFERENCE

The present application claims priority under 35 U.S.C. § 119 to Japanese Patent Application No. 2017-005802, filed on Jan. 17, 2017. The contents of this application are incorporated herein by reference in their entirety.

BACKGROUND

The present disclosure relates to an image forming system.

An image display device includes a display, an input section, and a controller. The display displays a preview image that represents an image to be printed using a printing section. The controller controls the display such that the preview image changes in response to a user operation input through the input section. By viewing the preview image displayed by the image display device, the user is able to check the image to be printed in advance.

SUMMARY

An image forming system of the present disclosure includes an image forming apparatus, a processing device, and a mobile terminal. The image forming apparatus forms an image on a recording medium. The processing device generates data of a temporally changing image that represents a temporal change of the image. The mobile terminal includes an imaging section, a display, a transmitter-receiver, and a controller. The imaging section generates data of a captured image by capturing the image formed on the recording medium. The display displays the captured image. The transmitter-receiver is connected to the processing device via a network. The controller controls the display and the transmitter-receiver. The controller controls the transmitter-receiver to obtain the data of the temporally changing image from the processing device. The controller controls the display to display the temporally changing image over the captured image.

DETAILED DESCRIPTION

Figure 1:
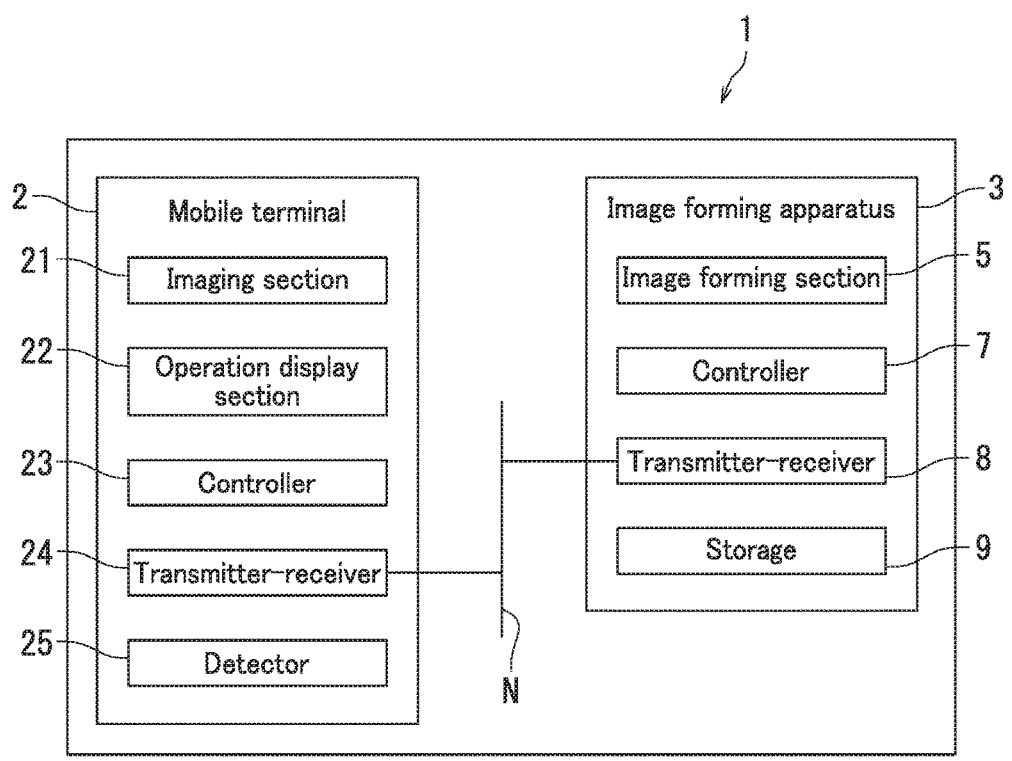
FIG. 1 is a block diagram illustrating an image forming system according to an embodiment of the present disclosure.

The following describes an image forming system 1 according to an embodiment of the present disclosure with reference to the drawings. Note that in the drawings, elements that are the same or substantially equivalent are labelled using the same reference signs and explanation thereof will not be repeated. The drawings schematically illustrate elements of configuration in order to facilitate understanding.

The following describes the image forming system 1 according to the embodiment of the present disclosure with reference to FIG. 1. FIG. 1 is a block diagram illustrating the image forming system 1 according to the embodiment of the present disclosure.

The image forming system 1 includes a mobile terminal 2 and an image forming apparatus 3. The mobile terminal 2 and the image forming apparatus 3 are connected with each other via a network N. The network N is for example a local area network (LAN), a wide area network (WAN), or the Internet.

The image forming apparatus 3 forms an image on paper. The image forming apparatus 3 is for example a multifunction peripheral. Note that the image forming apparatus 3 may be a copier, a printer, or a facsimile machine. The multifunction peripheral has for example at least two functions among a copy function, a printer function, and a facsimile function.

The mobile terminal 2 can be carried by a user. The mobile terminal 2 includes an imaging section 21, an operation display section 22 (an operation section), a controller 23, a transmitter-receiver 24, and a detector 25. The mobile terminal 2 is for example a mobile phone including a smartphone, a tablet computer, or a laptop computer.

The imaging section 21 generates captured image data indicating a captured image by capturing an image formed on paper. The imaging section 21 captures a moving image as the captured image. The imaging section 21 includes a camera, for example.

The operation display section 22 displays the captured image. The operation display section 22 is constituted by a display. The operation display section 22 outputs to the controller 23 operation signals corresponding to operations performed by the user. The display includes a liquid crystal display (LCD) having a touch panel function.

The detector 25 detects at least one of illuminance, temperature, and humidity. In the present embodiment, the detector 25 detects illuminance, temperature, and humidity. The detector 25 generates detection information that indicates detected illuminance, detected temperature, and detected humidity. The detector 25 is constituted by an illuminometer, a thermometer, and a hygrometer, for example.

The transmitter-receiver 24 transmits various data to and receives various data from the image forming apparatus 3 via the network N. For example, the transmitter-receiver 24 transmits the captured image data and the detection information to the image forming apparatus 3.

The controller 23 includes a processor such as a central processing unit (CPU), for example. The controller 23 controls the operation display section 22 and the transmitter-receiver 24 for example on the basis of computer programs stored in storage of the mobile terminal 2 in advance.

Figure 2:
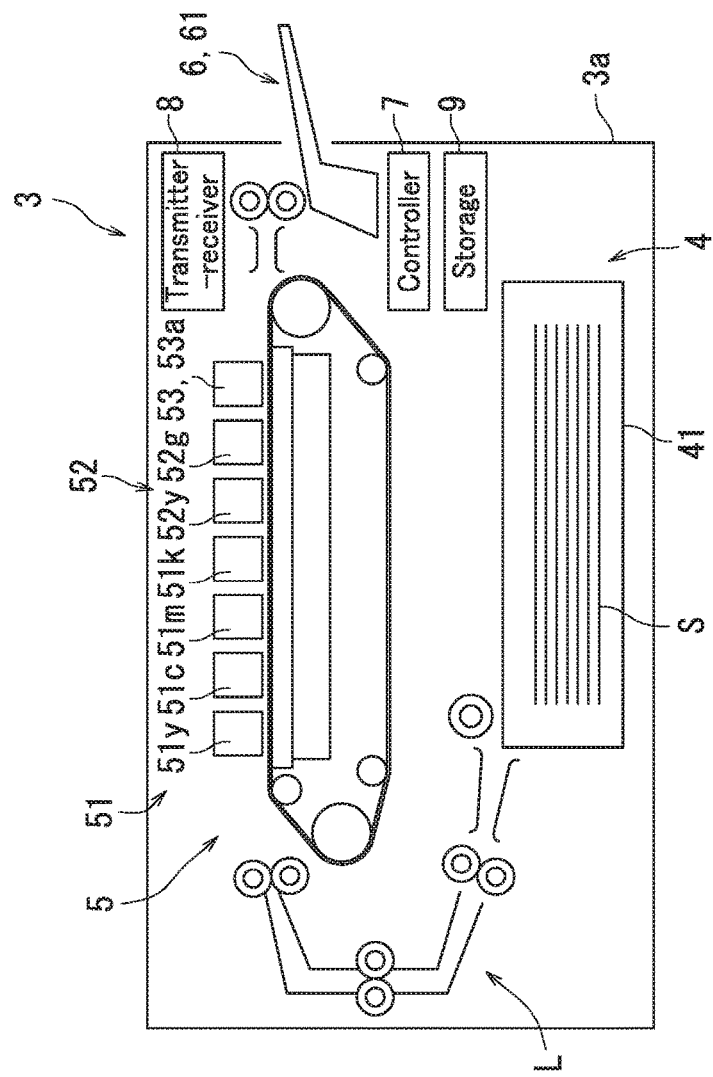
FIG. 2 is a diagram illustrating a configuration of an image forming apparatus according to the embodiment of the present disclosure.

Next, the following further describes the image forming apparatus 3 with reference to FIGS. 1 and 2. FIG. 2 illustrates the image forming apparatus 3 according to the embodiment of the present disclosure. As illustrated in FIG. 2, the image forming apparatus 3 of the present embodiment is an inkjet image forming apparatus, and forms an image on paper S using ink.

The image forming apparatus 3 includes a housing 3a, a paper feed section 4, an image forming section 5, an ejection section 6, a controller 7, a transmitter-receiver 8, and storage 9. The housing 3a accommodates the paper feed section 4, the image forming section 5, the controller 7, the transmitter-receiver 8, and the storage 9.

The paper S is an example of a recording medium in the present disclosure. The paper S is for example plain paper, copy paper, recycled paper, thin paper, thick paper, glossy paper, or overhead projector (OHP) paper.

The paper feed section 4 includes a paper feed cassette 41. The paper feed cassette 41 is located in a lower part of the housing 3a, for example. The paper feed cassette 41 is attachable to and detachable from the housing 3a. The paper feed cassette 41 is capable of accommodating plural sheets of the paper S stacked one on the other.

The image forming section 5 forms an image on the paper S using plural types of inks. The plural types of inks include normal inks and special inks, for example. The normal inks include a yellow ink, a magenta ink, a cyan ink, and a black ink, for example.

The special inks include ultraviolet inks and a scented ink. In the present embodiment, the ultraviolet inks include a green ink and a yellow ink. The colors of the ultraviolet inks appear when the inks receive light that includes ultraviolet light such as the sunlight after the inks are ejected onto the paper S, for example. The colors of the ultraviolet inks appear depending on illuminance of the light and a time over which the inks have received the light. Note that the ultraviolet inks are colorless when the inks have not received light.

The scented ink is colorless. The scented ink emits a scent of a flower to the surroundings after the ink is ejected onto the paper S, for example. As time passes, the scent emitted from the scented ink to the surroundings weakens depending on temperature and humidity. Note that the colors of the ultraviolet inks and the scent of the scented ink are preset by the user. The normal inks, the ultraviolet inks, and the scented ink are each loaded into a predetermined ink tank of the image forming apparatus 3.

The image forming section 5 includes a normal head section 51, an ultraviolet-ink head section 52, and a scented-ink head section 53, for example. The normal head section 51 includes a recording head 51y that ejects the yellow ink, a recording head 51c that ejects the cyan ink, a recording head 51m that ejects the magenta ink, and a recording head 51k that ejects the black ink. Note that the recording heads 51y, 51c, 51m, and 51k are each a line head or a serial head, for example.

The ultraviolet-ink head section 52 in the present embodiment includes a recording head 52y that ejects the ultraviolet ink of the yellow color and a recording head 52g that ejects the ultraviolet ink of the green color. The recording heads 52y and 52g are each a line head or a serial head, for example. Note that the ultraviolet-ink head section 52 may further include a recording head that ejects an ultraviolet ink of another color.

The scented-ink head section 53 in the present embodiment includes a recording head 53a that ejects the scented ink that emits the scent of the flower. The recording head 53a is a line head or a serial head, for example. Note that the scented-ink head section 53 may further include a recording head that ejects an ink that emits another scent.

The normal head section 51, the ultraviolet-ink head section 52, and the scented-ink head section 53 eject respective inks toward the paper S conveyed along a conveyance path L. Through the above, the image forming section 5 forms an image on the paper S using the inks. The paper S with the image formed thereon is conveyed along the conveyance path L and ejected to an exit tray 61 of the ejection section 6. Note that plural sheets of paper S with images formed thereon can be placed on the exit tray 61.

The transmitter-receiver 8 transmits various data to and receives various data from the mobile terminal 2 via the network N explained above with reference to FIG. 1. Specifically, the transmitter-receiver 8 receives from the mobile terminal 2 the captured image data generated by the imaging section 21 and the detection information generated by the detector 25.

The storage 9 includes a read only memory (ROM) device and a random access memory (RAM) device. The ROM device stores therein computer programs, for example. The RAM device stores therein ink information, for example. The ink information indicates temporal change of the special inks depending on environmental conditions such as illuminance, temperature, and humidity. In the present embodiment, the ink information indicates temporal change of the colors of the ultraviolet inks depending on illuminance, and temporal change of the scent of the scented ink depending on humidity and temperature.

The controller 7 includes a processor such as a central processing unit (CPU), for example. The controller 7 controls the paper feed section 4, the image forming section 5, and the transmitter-receiver 8 on the basis of computer programs stored in the storage 9.

Image data is input to the controller 7 from a personal computer outside the image forming apparatus 3 or from an input section such as a scanner, for example. The controller 7 controls the paper feed section 4, the image forming section 5, and the ejection section 6 to form an image on the paper S on the basis of the image data. For example, when the image data is input, the controller 7 stores the image data in the storage 9. The image data indicates an image to be formed on the paper S by the image forming section 5. The image data includes information of inks to be used by the image forming section 5 in formation of the image on the paper S.

The controller 7 in the present embodiment is an example of a processing device of the present disclosure. The controller 7 generates temporal change data that indicates a temporally changing image on the basis of the image data, the detection information, the captured image data, and the ink information. The temporally changing image represents a temporal change of the image formed on the paper S.

After receiving the captured image data from the mobile terminal 2, the controller 7 determines image data that indicates an image substantially identical with the captured image indicated by the captured image data from among image data stored in the storage 9. The controller 7 obtains the image data determined to be indicative of the image substantially identical with the captured image from the storage 9. The controller 7 determines whether or not an image indicated by image data is substantially identical with the captured image through pattern matching between the image indicated by the image data and the captured image, for example.

On the basis of the obtained image data, the controller 7 identifies an ink or inks used in formation of the image on the paper S. The controller 7 generates the temporal change data on the basis of ink information of the identified ink(s), the detection information, and the image data. The controller 7 controls the transmitter-receiver 8 to transmit the generated temporal change data to the mobile terminal 2. Note that a part of the temporally changing image formed using a normal ink is colorless.

The controller 23 explained above with reference to FIG. 1 obtains the temporal change data from the image forming apparatus 3 through the transmitter-receiver 24. The controller 23 controls the operation display section 22 to display the temporally changing image over the captured image on the basis of the captured image data and the temporal change data. As a result, the operation display section 22 displays a display image including the captured image and the temporally changing image. In the image forming system 1 of the present embodiment, the user is able to easily check a temporal change that the image formed on the paper S undergoes in the current environment by viewing the temporally changing image.

Next, the following describes a display image P displayed on the operation display section 22 of the mobile terminal 2 with reference to FIGS. 1 to 3D. FIGS. 3A to 3D illustrate an example of the display image P displayed on the operation display section 22.

Figure 3A:
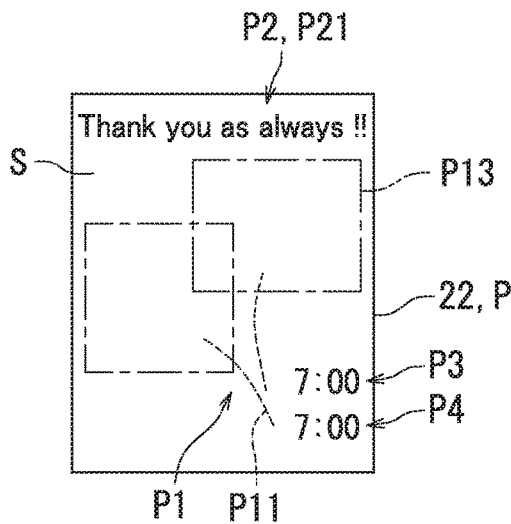
FIGS. 3A to 3D are diagrams illustrating an example of a display image displayed on an operation display section.

As illustrated in FIG. 3A, the display image P includes a temporally changing image P1, a captured image P2, a first supplementary image P3, and a second supplementary image P4. The temporally changing image P1 illustrated in FIG. 3A represents an image that appears on the paper S for example when one hour has elapsed after image formation on the paper S.

The temporally changing image P1 in the present embodiment includes a stalk image P11, a petal image P12 described below, and a scent intensity frame P13. The stalk image P11 is formed on the paper S using the ultraviolet ink of the green color.

The scent intensity frame P13 indicates a region to which the scented ink has been attached and intensity of the scent of the scented ink. The scent intensity frame P13 is indicated by visible chain lines, for example. The scent intensity frame P13 is arranged concentrically with a scented region of the paper S, for example. The scented ink has been attached to the scented region of the paper S. As time passes, the scent intensity frame P13 becomes smaller, indicating that the scent of the scented ink is getting weaker.

The captured image P2 in the present embodiment is an image captured by the imaging section 21 right after the image formation on the paper S. Therefore, the stalk image P11 and the petal image P12 that are formed using ultraviolet inks are colorless in the captured image P2. The captured image P2 represents a character string P21 formed on the paper S using a normal ink.

The first supplementary image P3 indicates a time necessary for colors of the ultraviolet inks to completely appear after the image formation on the paper S. The controller 7 calculates the time necessary for the colors of the ultraviolet inks to completely appear after the image formation on the paper S on the basis of for example the detection information and the ink information.

The second supplementary image P4 indicates a time necessary for the colors of the ultraviolet inks to completely appear after the image formed on the paper S is captured. The controller 7 calculates the time necessary for the colors of the ultraviolet inks to completely appear after the image formed on the paper S is captured on the basis of for example the captured image data, the detection information, the image data, and the ink information.

The temporally changing image P1 is displayed over the captured image P2. In the present embodiment, the temporally changing image P1 is displayed over the captured image P2 such that a colorless character string of the temporally changing image P1 is superposed on the character string P21 of the captured image P2, for example.

Through the above, displacement of the temporally changing image P1 relative to the captured image P2 is prevented or reduced.

Figure 3B:
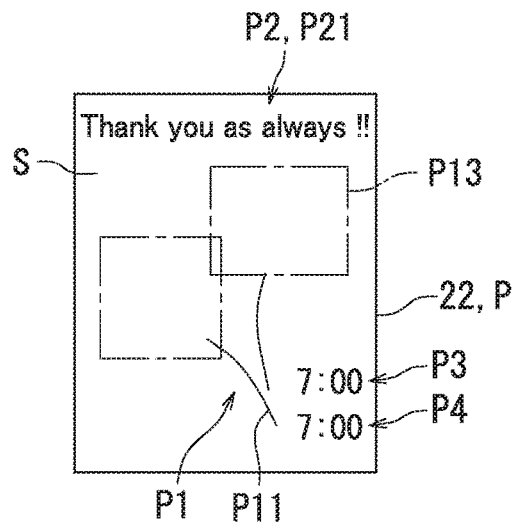

The temporally changing image P1 is a moving image that changes as time passes as illustrated in FIG. 3A through FIG. 3D. The temporally changing image P1 illustrated in FIG. 3B represents an image that appears on the paper S when for example three hours have elapsed after the image formation on the paper S. As illustrated in FIG. 3B, the color of the stalk image P11 represented in the temporally changing image P1 is more clearly visible than in the temporally changing image P1 illustrated in FIG. 3A.

Figure 3C:
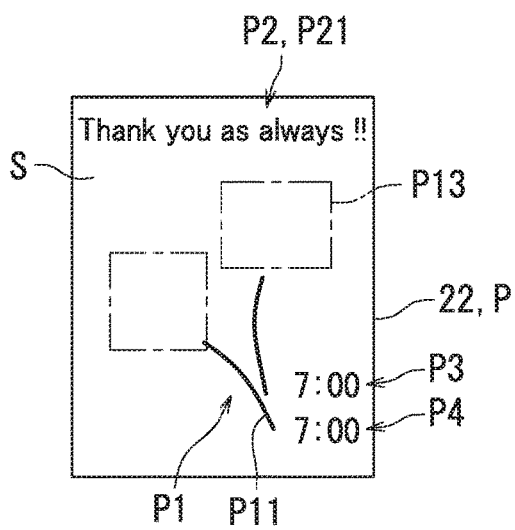

The temporally changing image P1 illustrated in FIG. 3C represents an image that appears on the paper S for example when five hours have elapsed after the image formation on the paper S. As illustrated in FIG. 3C, the color of the stalk image P11 represented in the temporally changing image P1 is more clearly visible than in the temporally changing image P1 illustrated in FIG. 3B.

Figure 3D:
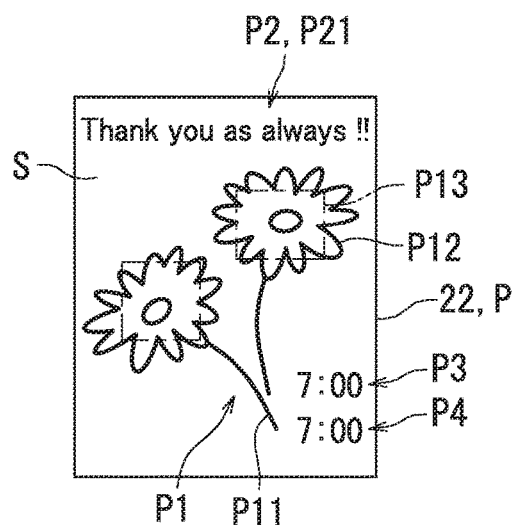

The temporally changing image P1 illustrated in FIG. 3D represents an image that appears on the paper S for example when seven hours have elapsed after the image formation on the paper S. As illustrated in FIG. 3D, the color of the ultraviolet ink of the stalk image P11 represented in the temporally changing image P1 is more clearly visible than in the temporally changing image P1 illustrated in FIG. 3C and has completely appeared. Also, the color of the ultraviolet ink of the petal image P12 represented in the temporally changing image P1 has completely appeared. The petal image P12 has been formed on the paper S using the ultraviolet ink of the yellow color.

As illustrated in FIGS. 3A to 3D, the temporally changing image P1 is a moving image. On the basis of operation signals, the controller 23 controls the operation display section 22 to reproduce the temporally changing image P1 and to make the operation display section 22 ready for reproducing a particular part of the temporally changing image P1. Therefore, the user is able to easily check the temporal change of the image formed on the paper S without observing the temporal change over a specific time in the current environment. Note that the controller 23 may control the operation display section 22 to display the temporally changing image P1 for example by double speed reproduction, fast-forwarding, and fast-rewinding.

Figure 4:
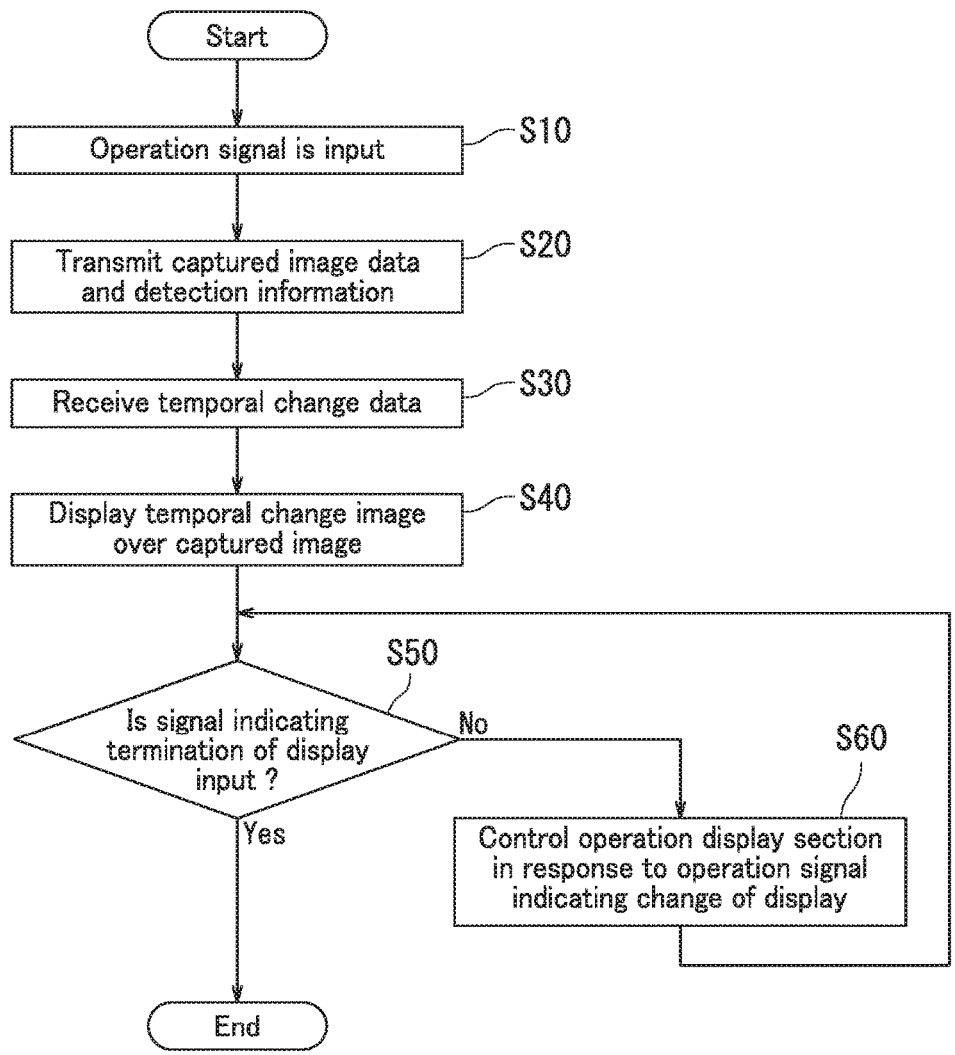
FIG. 4 is a flowchart illustrating display processing for a temporally changing image according to the embodiment of the present disclosure.

Next, the following describes display processing for the temporally changing image P1 with reference to FIGS. 1, 2, and 4. FIG. 4 is a flowchart illustrating the display processing for the temporally changing image P1 performed by the controller 23. The controller 23 starts the display processing for the temporally changing image P1 in response to an operation signal requesting display of the temporally changing image P1, for example.

In response to input of an operation signal at step S10, the controller 23 controls the transmitter-receiver 24 to transmit the captured image data and the detection information to the image forming apparatus 3 at step S20. After transmission of the captured image data and the detection information, the controller 23 controls the transmitter-receiver 24 to receive the temporal change data at step S30.

After receipt of the temporal change data, the controller 23 controls the operation display section 22 to display the temporally changing image P1 over the captured image P2 at step S40. After causing display of the temporally changing image P1 over the captured image P2, the controller 23 determines whether or not an operation signal indicating termination of the display of the temporally changing image P1 is input at step S50.

When the operation signal indicating termination of the display is not input (No at step S50) and an operation signal indicating change of the display of the temporally changing image P1 is input, the controller 23 controls the operation display section 22 at step S60 on the basis of the operation signal to reproduce the temporally changing image P1 or to make the operation display section 22 ready for reproducing a particular part of the temporally changing image P1, for example. As a result, the user is able to easily check the temporal change of the image formed on the paper S by viewing the temporally changing image P1.

When the operation signal indicating termination of the display is input (Yes at S50), the controller 23 ends the display processing for the temporally changing image P1.

Figure 5:
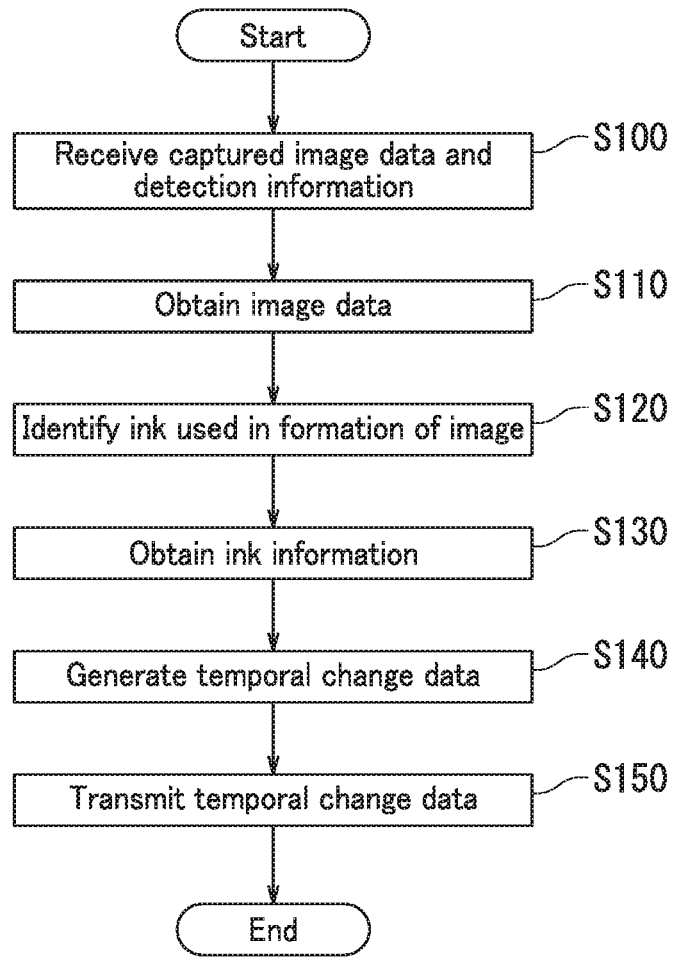
FIG. 5 is a flowchart illustrating temporal change data generation processing according to the embodiment of the present disclosure.

Next, the following describes temporal change data generation processing with reference to FIGS. 1, 2, and 5. FIG. 5 is a flowchart illustrating the temporal data generation processing performed by the controller 7. The controller 7 starts the temporal change data generation processing upon receipt of the captured image data and the detection information from the mobile terminal 2.

Upon receipt of the captured image data and the detection information at step S100, the controller 7 obtains image data indicating an image substantially identical with the captured image P2 from the storage 9 at step S110. After obtaining the image data, the controller 7 identifies an ink or inks used in formation of an image on the paper S on the basis of the image data at step S120.

After identifying the ink(s) used in formation of the image, the controller 7 obtains ink information of the identified ink(s) from the storage 9 at step S130. After obtaining the ink information, the controller 7 generates temporal change data that indicates a temporal change of the image formed on the paper S on the basis of the ink information, the detection information, and the image data at step S140. After generating the temporal change data, the controller 7 controls the transmitter-receiver 8 to transmit the temporal change data to the mobile terminal 2 at step S150, and the temporal change data generation processing ends.

Through the above, the image forming system 1 according to the embodiment of the present disclosure has been described with reference to FIGS. 1 to 5. However, the present disclosure is not limited to the present embodiment, and is practicable in various manners within a scope not departing from the gist of the present disclosure.

For example, in the above-described embodiment of the present disclosure, the temporal change data generation processing is performed by the controller 7. However, the present disclosure is not limited to this configuration. It is only required that the image forming system 1 includes a processing device that performs the temporal change data generation processing. The image forming system 1 may further include a processing device connected to the mobile terminal 2 and the image forming apparatus 3 via the network N, for example. The processing device includes a controller and storage, for example. The storage stores therein the ink information. The controller obtains the captured image data and the detection information from the mobile terminal 2 and the image data from the image forming apparatus 3. The controller performs the temporal change data generation processing on the basis of the captured image data, the detection information, the image data, and the ink information. Through the above, a burden on the controller 7 of the image forming apparatus 3 can be reduced, and a required capacity of the storage 9 of the image forming apparatus 3 can be reduced.

Also, the operation display section 22 is controlled by the controller 23 such that the colorless character string of the temporally changing image P1 is superposed on the character string P21 of the captured image P2 in the above-described embodiment of the present disclosure. However, the present disclosure is not limited to this configuration. It is only required that the temporally changing image P1 is displayed over the captured image P2. In another embodiment, the controller 7 of the image forming apparatus 3 controls the image forming section 5 to form a reference pattern including a reference point on the paper S in formation of an image using an ultraviolet ink and a scented ink. The reference point serves as a point of reference when the temporally changing image P1 is displayed over the captured image P2.

The controller 7 stores the reference pattern in association with the image data in the storage 9. The controller 7 generates the temporal change data by adding position information of the reference pattern, for example. As a result, the operation display section 22 is controlled by the controller 23 such that the reference point of the temporally changing image P1 is superposed on the reference point of the captured image P2 to display the temporally changing image P1 over the captured image P2. The reference pattern is a QR CODE (registered Japanese trademark) or a barcode, for example.

Also, the controller 7 determines whether or not an image indicated by image data is substantially identical with the captured image P2 through pattern matching in the above-described embodiment of the present disclosure. However, the present disclosure is not limited to this configuration. It is only required that the controller 7 is capable of obtaining the image data used in formation of the captured image P2 from the storage 9. In another embodiment of the present disclosure, the controller 7 may obtain the image data used in formation of the captured image P2 from the storage 9 through matching between a reference pattern of the captured image P2 and a reference pattern stored in association with the image data. Through the above, the controller 7 can be prevented from obtaining incorrect image data from the storage 9.

In the above-described embodiment of the present disclosure, the display image P includes the temporally changing image P1, the captured image P2, the first supplementary image P3, and the second supplementary image P4. However, the present disclosure is not limited to this configuration. For example, the temporally changing image P1 may include the first supplementary image P3 and the second supplementary image P4.

The drawings schematically illustrate elements of configuration in order to facilitate understanding, and properties of elements of configuration illustrated in the drawings, such as thicknesses and lengths thereof, may differ from actual properties thereof in order to facilitate preparation of the drawings. Furthermore, properties of the elements of configuration described in the above embodiment, such as shapes, are merely examples and are not intended as specific limitations. Various alternations may be made within a scope not substantially departing from the effects of the present disclosure.

What is claimed is:
1. An image forming system comprising:
   an image forming apparatus configured to form, on a recording medium using a special ink, an image which changes until a time necessary for completion of a temporal change;

a processing device configured to generate data of a temporally changing image that represents the temporal change of the image; and a mobile terminal, wherein the temporally changing image includes a first supplementary image that indicates the time necessary for completion of the temporal change of the special ink after the image is formed on the recording medium, the mobile terminal includes:
an imaging section that generates data of a captured image by capturing, during the temporal change, the image formed on the recording medium;
a display that displays the captured image;
a transmitter-receiver connected to the processing device via a network;
a controller that controls the display and the transmitter-receiver; and
a detector that detects at least one of illuminance, temperature, and humidity to generate detection information, the processing apparatus
obtains the data of the captured image and the detection information through the transmitter-receiver,
calculates the time on the basis of the data of the captured image and the detection information, and
generates the data of the temporally changing image including the first supplementary image indicating the time, and the controller
controls the transmitter-receiver to obtain the data of the temporally changing image from the processing device, and
controls the display to display the temporally changing image including the first supplementary image indicating the time over the captured image.

2. The image forming system according to claim 1, wherein
the image forming apparatus includes an image forming section that forms the image on the recording medium using plural types of inks,
the plural types of inks include a normal ink, an ultraviolet ink, and a scented ink, and
the image forming section includes a normal head section that ejects the normal ink, an ultraviolet-ink head section that ejects the ultraviolet ink, and a scented-ink head section that ejects the scented ink.

3. The image forming system according to claim 1, wherein
the temporally changing image includes a second supplementary image that indicates the time necessary for completion of the temporal change of the special ink after the image formed on the recording medium is captured.

4. The image forming system according to claim 1, wherein
the temporally changing image is a moving image that represents the temporal change of the image formed on the recording medium.

5. The image forming system according to claim 1, wherein
the mobile terminal further includes an operation section that outputs to the controller an operation signal indicating an operation performed by a user, and
on the basis of the operation signal, the controller controls the display to change the temporally changing image.

6. The image forming system according to claim 5, wherein
on the basis of the operation signal, the controller controls the display to reproduce the temporally changing image or to make the display ready for reproducing a particular part of the temporally changing image.

7. The image forming system according to claim 1, wherein
the processing device is included in the image forming apparatus.

8. The image forming system according to claim 1, wherein
in forming the image on the recording medium, the image forming apparatus forms a reference point that serves as a point of reference for displaying the temporally changing image over the captured image, and
the controller controls the display such that a reference point included in the temporally changing image is superposed on a reference point included in the captured image.

9. The image forming apparatus according to claim 1, wherein
the special ink includes an ultraviolet ink, and
the first supplementary image indicates time necessary for the color of the ultraviolet ink to completely appear after the image is formed on the recording medium.

* * * * *